Nov. 10, 1964  P. J. WEAVER  3,156,155
PANTOGRAPH MACHINE TOOLS
Filed May 25, 1962
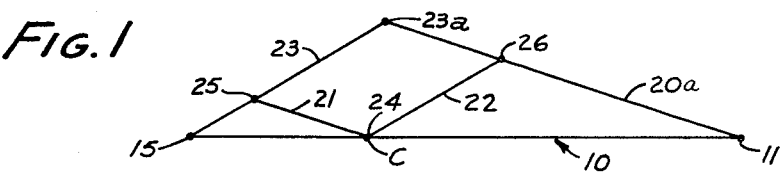
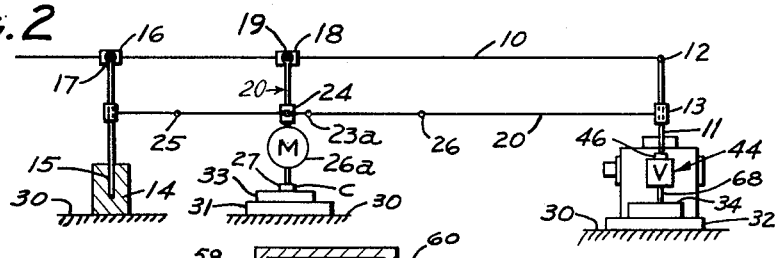
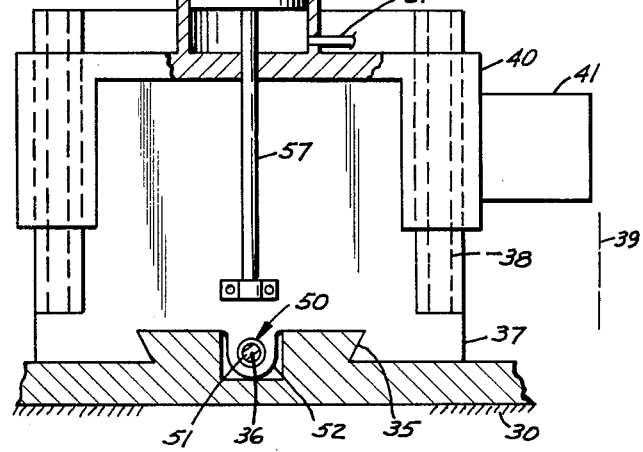
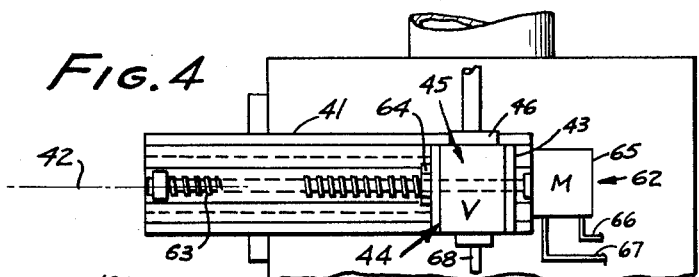
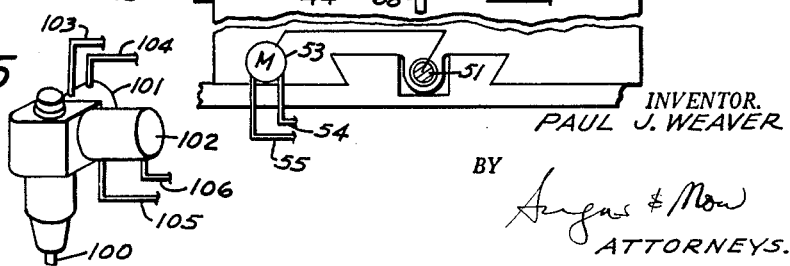
INVENTOR.
PAUL J. WEAVER
BY
*Angus & Mow*
ATTORNEYS.

United States Patent Office 3,156,155
Patented Nov. 10, 1964

3,156,155
PANTOGRAPH MACHINE TOOLS
Paul J. Weaver, Pasadena, Calif., assignor to True-Trace Corporation, El Monte, Calif., a corporation of Connecticut
Filed May 25, 1962, Ser. No. 197,695
8 Claims. (Cl. 90—13.1)

This invention relates to contour-copying machine tools, and particularly to contour-copying machine tools of the pantograph type.

Pantograph-type devices for reducing or enlarging the scale of a pattern in cutting a die are well known in the machine tool industry. The characteristics of such machines are parallelogram-type linkages including an arm carrying a quill to be traced over the surface of a pattern, and a cutting tool which cuts in a workpiece the contour traversed by the quill, but in a desired ratio to the size of the pattern. Vertical motion between the quill and cutting tool is provided by a vertical lift arm, which is connected to both of them. Duplication in the horizontal plane is accomplished by the well-known movement among the joints of the parallelogram linkage.

While pantograph-type machines are elaborately counter-balanced in order to reduce quill pressure on the pattern, and in order to give the machine operator close control over the movements of the machine with a minimum of effort, still these machines are massively constructed, and it is difficult for the operator to achieve a constant surface rate of feed of the quill over the surface of an undulating pattern from pass to pass over the pattern, without which constancy the quality of the article produced is deleteriously affected.

It is an object of this invention to provide a means for utilizing a tracer valve in combination with a pantograph-type machine which serves to operate a pantograph-type machine as a function of signals derived from the tracer valve. The actuation of a tracer valve requires only a light pressure on its stylus to deflect or otherwise move it to cause it to trace over the surface of a pattern. The output energy derived from the stylus signals can be as large or as small as desired, and bears no essential relationship to the force exerted by the stylus on the surface of the pattern. By utilizing a tracer valve, the operator is "decoupled" from the actuating linkage of the machine, and the rates and pressures become a function of the properties of the valve. All the operator need do is to set the device to move in selected paths, and the rest of the work is controlled uniformly by devices under control of the tracer valve.

Furthermore, tracer valves can be designed to coordinate rates of motion along a plurality of axes, thereby providing for a consistent and uniformly repetitive surface feed rate, and thereby an optimum quality of production. Utilizing a coordinating type of tracer valve completely frees the pantograph-type machine from dependence on the skill and stamina of an operator in the duplication of patterns.

This invention is carried out in combination with a pantograph-type machine tool of the class which includes a cutting member, a follower shaft member, a pantograph linkage interconnecting said members, a work support and a pattern support. The cutting member is adapted to cut a contour in a workpiece held by the work support. The follower shaft member is adapted to move in response to the contour of a pattern held by the pattern support. The invention includes a tracer valve element of the type which includes a movable stylus that is adapted to trace over the contour of the pattern, and in so doing to regulate the flow of fluid through at least a pair of fluid circuits to motive means for moving the tracer valve so that it follows the stylus commands to accomplish the tracing movement, the tracer valve being mounted to a slide assembly moved by the motive means. A joint interconnects the follower member to the tracer valve (or to a part of the slide assembly which moves, or moves with, the tracer valve). Accordingly, the tracing movement of the tracer valve is accompanied by identical motion of part of the pantograph linkage, and the pantograph-type machine is thereby operated, to make proportional movement of the cutter, from signals derived from the tracer valve.

According to a preferred but optional feature of the invention, the slide assembly includes three sets of interrelated slides and ways which enable the tracer valve to move in three dimensions, thereby to accomplish three dimensional pantographic duplications.

According to still another preferred but optional feature, the tracer valve is of the class in which valving means controlled by the stylus of the tracer valve exerts inverse control over two fluid circuits, whereby increased flow in one is accompanied by a decreased flow in the other, whereby the resultant movement of the cutter relative to the workpiece can be held sensibly constant regardless of the inclination of the contour being duplicated.

The above and other features of this invention will be fully understood from the following detailed description and the accompanying drawings in which:

FIGS. 1 and 2 are schematic illustrations of a suitable pantograph linkage for use in the invention;

FIG. 3 is a side view, partly in cutaway cross-section, showing a portion of a machine tool incorporating the invention;

FIG. 4 is a back view of FIG. 3; and

FIG. 5 is a schematic showing of another type of tracer valve useful in the invention.

FIGS. 1 and 2 illustrate a pantograph linkage suitable for use with the invention. For motion in the plane of FIG. 2, there is provided a rigid vertical lift arm 10. The lift arm is joined to a follower shaft 11 through a joint 12. Shaft 11 passes vertically through a sleeve 13. It is axially (vertically) movable in the sleeve. Sideward movement of the shaft moves sleeve 13 sidewardly.

A bearing 14 supports a pivot shaft 15 for rotation around a vertical axis. Pivot shaft 15 tiltably supports a sleeve 16 in which the lift arm is horizontally slidable. Sleeve 16, which is pivoted at point 17, provides a fulcrum for the lift arm.

A second sleeve 18 is pivoted at point 19 to a cutter support shaft 20. The lift arm is horizontally slidable in it. It will thereby be seen that up and down movement of the follower shaft causes up and down movement of the cutter support shaft in direct proportion to their spacings from pivot shaft 15.

Movement of the follower shaft toward and away from the pivot shaft is compensated for by the sliding of the lift arm in sleeves 16 and 18. The parallelogram linkage yet to be described maintains the same proportional spacing.

The aforesaid accounts for proportional vertical movement between the follower shaft and the cutter. The horizontal proportional movement is accomplished by the parallelogram linkage best shown in FIG. 1. A parallelogram actuating arm 20a extends to and supports sleeve 13. It forms one side of, and extends beyond, a parallelogram, which additionally includes linking arms 21, 22 and 23.

Arms 23 and 26 are jointed at joint 23a. Arms 21 and 22 are jointed at joint 24, and their joint is always in line with shafts 11 and 15 because of their connections to lift arm 10.

Arms 21 and 23 are joined at joint 25. Arms 20a and 22 and joined at joint 26. Joints 25 and 26 are adjustable along both arms to which they are attached, so that the length of the sides of the parallelogram can be adjustably set. This enables the pantographic ratio to be selectively adjusted.

A motor spindle 26a which drives a cutter 27 is mounted to the linkage so that the axis of rotation of the cutter passes through joint 24.

It will therefore be seen that the linkage shown in FIGS. 1 and 2 will cause proportional movement in three dimensions between a point on the axis of follower shaft 13 (or any point connected to shaft 13), and the cutting tool. This is exemplary of one type of pantograph linkage, but other well-known configurations also fall within the scope of the invention. The particular type of pantograph linkage and the means of setting its ratios constitute no limitation on the invention, and other pantograph linkages may be substituted for the illustrated construction.

One type of pantograph machine useful in this invention includes, in addition to the foregoing, a base 30 to which bearing 14 is mounted, and which forms a frame of reference for the device. A work support 31 and a pattern support 32 are mounted on the base. Vertical adjustment may be provided for either or both of the supports to help in making individual setups, but such details form no part of the invention and will not be further discussed here. A workpiece 33 is held by the work support, and a pattern 34 to be duplicated is held by the pattern support.

To the pattern support there is mounted a first ways 35 which constitutes a dovetail slide extending along a first axis 36. Axis 36 is normal to the plane of FIG. 3. To first ways 35 there is mounted a first slide 37 movable along axis 36.

The first slide mounts second ways 38 which extends vertically along a second axis 39. Axis 39 is normal to axis 36. A second slide 40 is mounted on the second ways, and is movable vertically along the second axis.

Third ways 41 is mounted to the second slide and extends along a third axis 42. Axis 42 is normal to axes 36 and 39. A third slide 43 is mounted to the third ways to move in a horizontal direction.

A tracer valve 44, which will be described in fuller detail below, includes a body 45. The body is attached to the third slide so as to partake of the motion of the third slide. A thrust bearing joint 46 connects the follower shaft 11 to the body. The bearing joint enables the tracer valve body to move shaft 11 axially, and enables relative rotation to occur between the shaft and the body when shaft 11 is moved laterally.

First slide drive means 50 comprises a lead screw 51 journaled to the first ways, and a nut 52 on the first slide. A motor 53 (FIG. 4), such as a rotary fluid-actuated motor with pair of conduits 54, 55 to receive and carry away fluid used for driving the motor, is mounted to the first ways so as to rotate the lead screw, and through the nut, to shift the first slide along the first ways.

Second slide drive means 56 includes a piston rod 57 with its free end attached to the first slide, and its other end attached to a piston 58. The piston moves inside a cylinder 59. Two conduits 60, 61 are provided for receiving and carrying away fluid used for driving the piston in the cylinder. One of the conduits enters the cylinder on each side of the piston. The cylinder is mounted on the second slide so that as the cylinder shifts relative to the piston, the second slide shifts relative to the first slide.

Third slide drive means 62 includes a lead screw 63 journaled to the third ways, and a nut 64 engaged to lead screw 63. A rotary fluid-actuated motor 65 is mounted to the third ways. This motor is provided with two conduits 66, 67 to receive and carry away fluid used for driving the motor.

The conduits of the three motors are used for introducing fluid under pressure to a selected side of the motor, and for exhausting it from the other. The selection of which conduit is under pressure and which under exhaust is the function of equipment yet to be discussed.

Fluid motors constitute only one example of a type of motor which may be used in this invention. Electric motors could be used instead. Furthermore, piston-cylinder-type motors could be used for all of the motions, as could rotary motors turning lead screws, instead of the more convenient arrangement shown in the drawings.

Tracer valve 45 shown in the drawings is the presently preferred embodiment. Its internal construction is fully disclosed in applicant's copending application Serial No. 748,426, filed July 14, 1958, now Patent No. 3,055,393, issued September 25, 1962, entitled "Pattern Controlled Machine Tool," and assigned to the same assignee as the instant patent application. A feature of this type of tracer valve is that a single spool valve, which is under control of a stylus 68, controls two separate fluid circuits, the rates of flow through the circuits being inversely related. The stylus is vertically movable along the second axis by exerting a force on its end. Its tip is pivotably movable away from said second axis by deflecting the tip of the stylus to one side or the other from its central null position. In the null position, the stylus is parallel to the second axis.

One of the circuits is controlled by a four-way type valve sector, for which a first pair of conduits constitutes the fluid circuit. This sector determines which of its conduits is to be under pressure and which under exhaust connections, and also the rate of flow therethrough. A second pair of conduits is connected to another sector of the valve (sometimes called a "coordinating sector"), the rate of fluid flow through which is inversely related to the rate of fluid flow through the first pair of conduits. As is fully set forth in the aforesaid copending patent application, when the flow rate increases or decreases through the circuit comprising the second pair of conduits, it decreases or increases, respectively, in the circuit comprising the first pair of conduits. These two circuits are respectively connected to ones of the motors, so that two of the motors are under coordinated control of the tracer valve. Thus, should the tracer valve be feeding along the third axis (the respective motor being run by pressurized fluid in the circuit comprising the second pair of conduits), the feed rate along the third axis will be at a maximum should the stylus be in a null position characterized by its tracing a surface having no obstacles or inclination. There will be no motion along the second axis, which is under control of the four-way valve sector. However, should the stylus encounter an obstruction, drop into a cavity, or meet an inclined surface, then the stylus will move to shift the valve spool from its null position, and flow will occur in the four-way valve sector, and thereby through the circuit comprising the first pair of conduits. The flow rate will be simultaneously lessened in the circuit comprising the second set of conduits, and, perhaps, even be reduced to zero. Intermediate conditions result in intermediate rates of movement along both axes. This creates a coordinated action along two axes which provides a sensibly constant surface rate of feed of the stylus over the pattern, and of the cutter over the workpiece.

Cutting action is accomplished in the planes of FIGS. 3 and 4 to cut a contour lying in a single (vertical) plane in the workpiece. To complete a three-dimensional contour, it is necessary to move the second slide along the first axis in a pick feed movement, which may be controlled by a pick feed control valve (not shown) which periodically, at the end of each stroke of the work table, feeds a quantity of fluid to the second motor to shift the table incrementally along the respective axis.

Limit stops, circuit reversal valves, and pick feed controls may be provided, such as shown in applicant's copending patent application Serial No. 780,434, filed December 15, 1958, now Patent No. 3,045,435, issued July 25, 1962, entitled "Machine Tool Control," and in Weaver Patent No. 2,976,688, wherein circuits useful with this invention are shown.

When a single spool valve is used to control movement along two axes, the purposes of a cycling control is to make successive spaced-apart passes over the surface of a pattern. Their operation is that of moving the slide to which the valve is mounted in alternate feeding directions along one axis, and stepping the tracer valve and pattern relative to each other in a pick feed motion along another axis between each feed stroke. This is the preferred embodiment of the invention, and utilizes the tracer valve shown in the aforesaid Weaver patent application Serial No. 748,426, filed July 14, 1958. This arrangement has the advantage that a completely automatic, rate-coordinated motion of the tracer valve over the entire surface of the pattern is secured. It will be recognized that the cycling circuits shown in the aforesaid Weaver application Serial No. 780,434, and in Weaver Patent No. 2,976,688, are relatively complex. Less complicated circuitry is also readily adaptable to this device, such as simple reversing and stepping switches, and even with manual pick feed control.

Furthermore, it is not necessary to this invention that the tracer action be automatic. For example, the tracer valve shown in Rosebrook Patent No. 2,753,145, issued July 3, 1956, can be used instead of the aforesaid single-spool tracer valve. The Rosebrook tracer valve (see FIG. 5) has a stylus 100 and spool valves 101 and 102 respectively controlling fluid flow to conduits 103, 104 comprising a first circuit, and conduits 105, 106 comprising a second circuit. These circuits might, for example, control the first and third axis motors, respectively. This would accomplish pantographic movement in a single horizontal plane in the illustrated machine. This tracer valve would be directly substituted for that shown in FIG. 4. It is also possible to utilize three dimensional tracer valves such as that shown in Rosebrook Patent No. 2,835,466, issued May 20, 1958, wherein a stylus controls the position and fluid flow through three spool valves. Such a tracer valve could be utilized to control fluid circuits to the first, second and third slide drive means respectively.

Furthermore, it is possible to combine all of these types of operation by utilizing the tracer valves shown in applicant's copending application Serial No. 180,971, filed March 20, 1962, entitled "Convertible Mode Tracer Valve," which can provide not only the coordinated action illustrated in the instant application, but also the two axis and three axis controls of the aforesaid Rosebrook patents.

It is also possible to utilize an automatic tracer valve such as shown in Rosebrook Patent No. 3,006,595, issued October 31, 1961, whose function is identical to that of the spool valve illustrated in FIG. 5, except that its movement in one plane, usually horizontal, is automatic.

It will now be seen that utilizing various types of tracers in their conventional manners, either by deflecting the stylus to traverse a pattern, or by feeding the table along one axis beneath a tracer valve, the tracer valve will cause itself to pass over the pattern in a path in space exactly congruent to the shape of the pattern. This movement, in turn, is applied as power to the follower shaft which shifts up and down in sleeve 13 to actuate the vertical lift arm to cause vertical movement in the pantographic operation. Side movement of the follower shaft exerts a sideward force to shift the linkage in the plate of FIG. 1, the resulting movement of the cutter being in the proportion dictated by the parallelogram linkage.

It will be seen from the foregoing, that the invention constitutes a tracer-controlled means for powering the movements of the pantograph arm as a function of the activity of the tracer valve, either as derived from manual or automatic operation of the stylus, or from powering the feed along one of the axes to cause the tracer to react with the pattern. It is adaptable to single or multiple axis tracer valve control, and is capable of relieving the operator of considerable manual effort in all embodiments, and of providing means for automated control for close duplication of reactions from pass to pass when the valve is of the type which coordinates movement along a plurality of axes, or of the type which deflects the stylus to seek the pattern and move the stylus along the pattern.

The illustrated pantograph linkage is three dimensional in operation. The lift arm constitutes a single-axis pantograph linkage. The parallelogram assembly constitutes a two dimensional (two axis) parallelogram linkage.

This invention is not to be limited by the embodiments shown in the drawings and described in the description which are given by way of example and not of limitation, but only in accordance with the scope of the appended claims.

I claim:

1. In combination with a pantograph type machine tool of the class which includes a cutting member, a follower shaft member, a pantograph linkage interconnecting said members, a work support and a pattern support, the cutting member being adapted to cut a contour in a workpiece held by the work support, and the follower shaft member being adapted to respond to the contour of a pattern which is held by the pattern support, the improvement comprising: a tracer valve element of the type which includes a deflectable stylus adapted to trace over the contour of the pattern and fluid control means controlled by the stylus adapted to control the flow of fluid in a fluid circuit as a function of stylus position; a ways which is movable relative to the pattern support; a slide element mounted to said ways; a motive means for moving the slide element, said motive means being regulated and powered by fluid passed through said fluid circuit; the tracer valve being mounted to the slide element; and a joint interconnecting the follower shaft member to one of said elements for concurrent movement therewith.

2. Apparatus according to claim 1 in which the stylus has an axis, and in which the joint is connected to said tracer valve in line with the axis.

3. Apparatus according to claim 1 in which a pair of ways and slide elements are provided, said ways being disposed at right angles to each other, there being an individual motive means for each; and in which the tracer valve is adapted to control flow through both of said motive means.

4. In combination with a pantograph type machine tool of the class which includes a cutting member, a follower shaft member, a pantograph linkage interconnecting said members, a work support and a pattern support, the cutting member being adapted to cut a contour in a workpiece held by the work support, and the follower shaft member being adapted to respond to the contour of a pattern which is held by the pattern support, the improvement comprising: a tracer valve element of the type which includes a deflectable stylus adapted to trace over the contour of the pattern and fluid control means controlled by the stylus adapted to control the flow of fluid in at least two fluid circuits as a function of stylus position; a pair of obliquely oriented ways, a first one of which is mounted to the pattern support; a slide element mounted to each of said ways, the second ways being mounted to the slide element mounted on the first ways, and the second slide element being mounted on the second ways; a pair of motive means, each interconnecting the members of a respective pair of slides and ways, each motive means being regulated and powered by fluid passed through a respective one of said fluid circuits; the tracer valve being mounted to the slide element on the ways which is not mounted to the pattern support; and a joint interconnecting the follower shaft member to one of said elements for concurrent movement therewith.

5. Apparatus according to claim 4 in which the stylus has an axis, and in which the joint is connected to said tracer valve in line with the axis.

6. Apparatus according to claim 4 in which a pair of ways and slide elements are provided, said ways being disposed at right angles to each other.

7. In combination a pantograph arm adapted to control a pantograph mechanism; a tracer valve element of the type which includes a deflectable stylus adapted to trace over the contour of the pattern and fluid control means controlled by the stylus adapted to control the flow of fluid in at least two fluid circuits as a function of stylus position; a pair of obliquely oriented ways, a first one of which is mounted to the pattern support; a slide element mounted to each of said ways, the second ways being mounted to the slide element mounted on the first ways, and the second slide element being mounted on the second ways; a pair of motive means, each interconnecting the members of a respective pair of slides and ways, each motive means being regulated and powered by fluid passed through a respective one of said fluid circuits; the tracer valve being mounted to the slide element on the ways which is not mounted to the pattern support; and a joint interconnecting the follower member to one of said elements for concurrent movement therewith.

8. Apparatus according to claim 7 in which the tracer valve includes a spool valve adapted to control and inversely coordinate the rates of operation of two motive means.

References Cited in the file of this patent
UNITED STATES PATENTS

| | | |
|---|---|---|
| 2,742,823 | Compton | Apr. 24, 1956 |
| 2,998,759 | Dugle et al. | Sept. 5, 1961 |
| 3,065,554 | Colabella | Nov. 27, 1962 |